US 9,113,157 B2

(12) United States Patent
Sone et al.

(10) Patent No.: US 9,113,157 B2
(45) Date of Patent: Aug. 18, 2015

(54) DISPLAY DEVICE WITH GRAY SCALE DATA CORRECTION

(75) Inventors: Takuya Sone, Osaka (JP); Noriyuki Tanaka, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 64 days.

(21) Appl. No.: 14/000,786

(22) PCT Filed: Feb. 22, 2012

(86) PCT No.: PCT/JP2012/054303
§ 371 (c)(1),
(2), (4) Date: Aug. 21, 2013

(87) PCT Pub. No.: WO2012/115161
PCT Pub. Date: Aug. 30, 2012

(65) Prior Publication Data
US 2013/0321493 A1   Dec. 5, 2013

(30) Foreign Application Priority Data

Feb. 25, 2011 (JP) .................................. 2011-040287

(51) Int. Cl.
*G09G 5/10* (2006.01)
*H04N 13/04* (2006.01)
(Continued)

(52) U.S. Cl.
CPC .......... *H04N 13/0404* (2013.01); *G02B 27/225* (2013.01); *H04N 13/007* (2013.01); *H04N 13/04* (2013.01); *H04N 13/0409* (2013.01); *G09G 3/003* (2013.01)

(58) Field of Classification Search
CPC ................. G02B 27/2214; G09G 2320/0209; G09G 2320/068; G09G 3/003; H04N 13/0409; H04N 13/0018; H04N 13/0037; H04N 13/0048; H04N 13/0051; H04N 13/0055; H04N 13/0059; H04N 13/0285; H04N 13/0422; H04N 13/0425; H04N 13/0445; H04N 13/0454; H04N 13/0456; H04N 13/0497; G02F 1/1313; G02F 1/1323
USPC .......................................................... 345/690
See application file for complete search history.

(56) References Cited

U.S. PATENT DOCUMENTS 6,573,928 B1   6/2003 Jones et al.
6,970,290 B1 * 11/2005 Mashitani et al. ............ 359/462
(Continued)

FOREIGN PATENT DOCUMENTS

JP   2004-312780 A   11/2004
JP   2007-316460 A   12/2007
(Continued)

OTHER PUBLICATIONS

International Search Report corresponding to PCT/JP2012/054303, dated May 29, 2012.

*Primary Examiner* — Stephen Sherman
(74) *Attorney, Agent, or Firm* — Lowe Hauptman & Ham, LLP

(57) ABSTRACT

The display device includes: a display unit configured to display a combined image formed by dividing a plurality of different images into divided images and arranging the divided images in a predetermined order; a separating unit configured to separate the plurality of images included in the combined image; and a correcting unit configured to correct the gray scale data of a pixel that displays one of the plurality of images included in the combined image that the viewer is supposed to see, wherein the correcting unit includes: a shift amount generating unit configured to generate a shift amount used to adjust the gray scale data of each pixel that displays one of the plurality of images included in the combined image; and a determining unit configured to determine a correction amount used to correct the gray scale data using the shift amount generated by the shift amount generating unit.

14 Claims, 12 Drawing Sheets

(51) Int. Cl.
*G02B 27/22* (2006.01)
*H04N 13/00* (2006.01)
*G09G 3/00* (2006.01)

(56) References Cited

U.S. PATENT DOCUMENTS

| | | | |
|---|---|---|---|
| 7,432,902 B2 * | 10/2008 | Yun | 345/96 |
| 2003/0117489 A1 | 6/2003 | Jones et al. | |
| 2005/0248972 A1 * | 11/2005 | Kondo et al. | 365/125 |
| 2007/0273715 A1 | 11/2007 | Sugiyama et al. | |
| 2008/0007511 A1 * | 1/2008 | Tsuboi et al. | 345/102 |
| 2009/0136158 A1 * | 5/2009 | Tamura | 382/293 |
| 2009/0303157 A1 | 12/2009 | Imai et al. | |
| 2010/0215347 A1 * | 8/2010 | Ikeda et al. | 386/108 |
| 2011/0141130 A1 * | 6/2011 | Yagiura | 345/589 |

FOREIGN PATENT DOCUMENTS

| | | |
|---|---|---|
| JP | 2009-145640 A | 7/2009 |
| WO | 2007032132 A1 | 3/2007 |

* cited by examiner

DISPLAY DEVICE WITH GRAY SCALE DATA CORRECTION

RELATED APPLICATIONS

The present application is a National Phase of International Application Number PCT/JP2012/054303, filed Feb. 22, 2012, and claims priority from Japanese Application Number 2011-040287, filed Feb. 25, 2011.

TECHNICAL FIELD

The present invention relates to display devices where crosstalk can be reduced.

BACKGROUND ART

Recently, display devices have been proposed that use a parallax barrier to separate a plurality of images included in a combined image displayed on the display panel to allow them to be viewed from different directions. Examples include the display devices described in WO 2007-32132 and JP 2004-312780 A. These display devices are commercialized as, for example, stereoscopic displays in digital cameras, dual-view display devices mounted on vehicles, and the like.

However, when a viewer sees one of a plurality of images on such display devices, he may see another image as well (crosstalk). This makes it difficult to view the image that the viewer is supposed to view.

While approaches described in the above publications may reduce crosstalk, they may decrease the contrast of images of certain types.

DISCLOSURE OF THE INVENTION

An object of the present invention is to provide a display device where crosstalk may be reduced while minimizing the reduction in the contrast of images.

A display device of the present invention includes: a display unit configured to display a combined image formed by dividing a plurality of different images into divided images and arranging the divided images in a predetermined order; a separating unit configured to separate the plurality of images included in the combined image; and a correcting unit configured to correct gray scale data of a pixel that displays one of the plurality of images included in the combined image that a viewer is supposed to view, wherein the correcting unit includes: a shift amount generating unit configured to generate a shift amount used to adjust gray scale data of each pixel that displays one of the plurality of images included in the combined image; and a determining unit configured to determine a correction amount used to correct the gray scale data using the shift amount generated by the shift amount generating unit.

The display device of the present invention reduces crosstalk while minimizing the reduction in the contrast of images.

EMBODIMENTS FOR CARRYING OUT THE INVENTION

Figure 1:
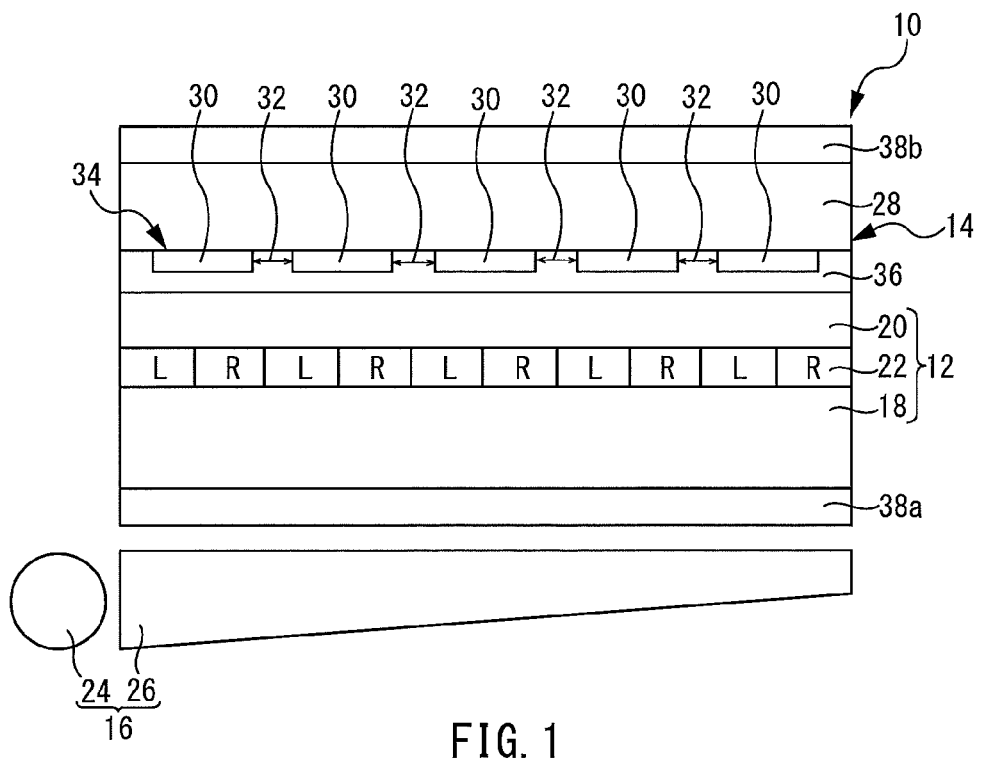
FIG. 1 is a schematic view of an exemplary configuration of a display device of a first embodiment of the present invention.

A display device according to an embodiment of the present invention includes: a display unit configured to display a combined image formed by dividing a plurality of different images into divided images and arranging the divided images in a predetermined order; a separating unit configured to separate the plurality of images included in the combined image; and a correcting unit configured to correct gray scale data of a pixel that displays one of the plurality of images included in the combined image that a viewer is supposed to view, wherein the correcting unit includes: a shift amount generating unit configured to generate a shift amount used to adjust gray scale data of each pixel that displays one of the plurality of images included in the combined image; and a determining unit configured to determine a correction amount used to correct the gray scale data using the shift amount generated by the shift amount generating unit (first arrangement).

According to the first arrangement, a correction amount is determined for each image. As such, appropriate crosstalk correction is possible while minimizing the reduction in the contrast of images.

A second arrangement provides that, in the first arrangement, the correcting unit further includes a group generating unit configured to group shift amounts generated by the shift amount generating unit according to a magnitude of each shift amount, and the determining unit determines the correction amount by referencing a number of shift amounts in each group generated by the group generating unit. In this arrangement, it can be determined how shift amounts are distributed. As such, an appropriate correction amount may be found while minimizing the reduction in the contrast of images.

A third arrangement provides that, in the first arrangement, the correcting unit further includes: a group generating unit configured to group shift amounts generated by the shift amount generating unit according to a magnitude of each shift amount; and a reference data supply unit configured to supply reference data used when the determining unit determines the correction amount, and the determining unit determines the correction amount by referencing a number of shift amounts in each group generated by the group generating unit and the reference data supplied by the reference data supply unit. In this arrangement, it may be determined how shift amounts are distributed, and the result may be used to determine a correction amount. As such, an appropriate correction amount may be found while minimizing the reduction in the contrast of images.

A fourth arrangement provides that, in the first arrangement, the correcting unit includes a storage unit configured to store at least one frame of shift amounts generated by the shift amount generating unit, and determines the correction amount using the shift amounts read from the storage unit.

A fifth arrangement provides that, in the first arrangement, the correcting unit includes a storage unit configured to store at least one frame of shift amounts generated by the shift amount generating unit, and determines the correction amount using the shift amounts read from the storage unit such that the correction amount gradually changes from one frame to another. In this arrangement, rapid changes in the correction amount may be reduced.

A sixth arrangement provides that, in the first arrangement, the correcting unit further includes a maximum value selecting unit configured to select a maximum value of the shift amount generated by the shift amount generating unit, and the determining unit determines the correction amount using the maximum value of the shift amount selected by the maximum value selecting unit. In this arrangement, an appropriate correction amount may be found while minimizing the reduction in the contrast of images.

A seventh arrangement provides that, in the first arrangement, the correcting unit further includes: a maximum value selecting unit configured to select a maximum value of the shift amount generated by the shift amount generating unit; and a minimum value selecting unit configured to select a minimum value of the shift amount generated by the shift amount generating unit, and the determining unit determines the correction amount using the maximum value of the shift amount selected by the maximum value selecting unit and the minimum value of the shift amount selected by the minimum value selecting unit. In this arrangement, an appropriate correction amount may be found while minimizing the reduction in the contrast of images.

An eighth arrangement provides that, in the first arrangement, the correcting unit further includes an average value calculating unit configured to calculate an average value of the shift amount generated by the shift amount generating unit, and the determining unit determines the correction amount using the average value of the shift amount calculated by the average value calculating unit. In this arrangement, an appropriate correction amount may be found while minimizing the reduction in the contrast of images.

A ninth arrangement provides that, in any one of the first to eighth arrangements, the correction unit further includes a checking unit configured to check a region of the display unit where the combined image is displayed, and the shift amount generating unit generates the shift amount using a result of checking by the checking unit. In this arrangement, an appropriate correction amount may be found while minimizing the reduction in the contrast of images.

A tenth arrangement provides that, in any one of the first to ninth arrangements, the correcting unit further includes a judging unit configured to judge whether each of the plurality of images is a still image or a dynamic image, and the determining unit determines the correction amount using a result of judgment by the judging unit. In this arrangement, an appropriate correction amount may be found while minimizing the reduction in the contrast of images.

An eleventh arrangement includes: a display unit configured to display a combined image formed by dividing a plurality of different images into divided images and arranging the divided images in a predetermined order; a separating unit configured to separate the plurality of images included in the combined image to allow them to be viewed from different directions; and a correcting unit configured to correct gray scale data of a pixel that displays one of the plurality of images included in the combined image that a viewer is supposed to view, wherein the correcting unit corrects the gray scale data of the pixel that displays the image that the viewer is supposed to view according to the following equation (1):

$$I_o = I_X + \{U \times (I_M - I_X) - (C+1) \times (I_Y + 1)\} / (I_M + 1) \qquad (1),$$

where $I_X$ is the gray scale data of the pixel that displays the image that the viewer is supposed to view, $I_Y$ is gray scale data of a pixel that is a factor for crosstalk, $I_M$ is a maximum value of the gray scale data of the pixel that displays the image that the viewer is supposed to view, C is a crosstalk level, U is a shift amount used to adjust gray scale data of an image that displays each of the plurality of images included in the combined image, and $I_o$ is gray scale data of the pixel for which correction has been done by the correcting unit, wherein each of the shift amount U and the crosstalk level C is set to a predetermined value regardless of a kind of the plurality of images included in the combined image. In this arrangement, appropriate crosstalk correction is possible while minimizing the reduction in the contrast of images.

A twelfth arrangement provides that, in any one of the first to eleventh arrangements, the correcting unit further includes a factor gray scale data generating unit configured to generate factor gray scale data that represents a factor for the crosstalk based on gray scale data of a pixel that displays one of the plurality of images included in the combined image that is other than the image that the viewer is supposed to view, and the determining unit determines the correction amount using the shift amount generated by the shift amount generating unit and the factor gray scale data generated by the factor gray scale data generating unit. In this arrangement, the gray scale data of a pixel that displays an image that the viewer is supposed to view may be corrected based on the gray scale data of all the pixels that can be factors for crosstalk. As such, more appropriate crosstalk correction is possible.

A thirteenth arrangement provides that, in the twelfth arrangement, the factor gray scale data generating unit generates the factor gray scale data by averaging gray scale data of pixels that display the one of the plurality of images included in the combined image that is other than the image that the viewer is supposed to view. In this arrangement, factor gray scale data may be generated in a simple manner.

A fourteenth arrangement provides that, in the twelfth arrangement, the generating unit generates the factor gray scale data by multiplying the gray scale data of the pixel that displays the one of the plurality of images included in the combined image that is other than the image that the viewer is supposed to view by a rate of contribution of that pixel to the crosstalk and sums a product. In this arrangement, appropriate factor gray scale data may be generated. As such, more appropriate crosstalk correction is possible.

A fifteenth arrangement provides that, in the twelfth arrangement, the generating unit has a lookup table indicating a relationship between the gray scale data of the pixel that displays the image other than the image that the viewer is supposed to view and the factor gray scale data, and the generating unit generates the factor gray scale data using the gray scale data of the pixel that displays the image other than the image that the viewer is supposed to view and the lookup table. In this arrangement, appropriate factor gray scale data may be stored in the lookup table. As such, more appropriate crosstalk correction is possible.

A sixteenth arrangement provides that, in any one of the twelfth to fifteenth arrangements, the generating unit generates the factor gray scale data by, when generating factor gray scale data for a pixel that displays the image that the viewer is supposed to view and that is located at an edge of a display region where the combined image is displayed, supposing gray scale data of a pixel that displays the image other than the image that the viewer is supposed to view and that does not exist, and using the supposed gray scale data to generate the factor gray scale data. In this arrangement, factor gray scale data may be generated in connection with a pixel located at an edge of the display region.

A seventeenth arrangement provides that, in any one of the first to sixteenth arrangements, the separating unit is a parallax barrier configured to separate the plurality of images included in the combined image to allow them to be viewed from different directions.

An eighteenth arrangement provides that, in any one of the first to sixteenth arrangements, the separating unit is a lenticular lens configured to separate the plurality of images included in the combined image to allow them to be viewed from different directions.

A nineteenth arrangement provides that, in any of the first to sixteenth arrangements, the separating unit is a liquid crystal lens configured to separate the plurality of images included in the combined image to allow them to be viewed from different directions.

A twentieth arrangement provides that, in any one of the first to sixteenth arrangements, the separating unit is a partial phase plate configured to separate the plurality of images included in the combined image to allow them to be viewed from different directions.

A twenty-first arrangement provides that, in any one of the first to twentieth arrangements, a converting unit configured to convert the gray scale data to data of a predetermined number of bits is further included, and the correcting unit corrects the gray scale data using the data resulting from conversion by the converting unit. In this arrangement, even gray scale data that is not a gray scale value but a voltage value or a luminance value, for example, may be easily corrected.

Now, more specific embodiments of the present invention will be described with reference to drawings that show examples of the embodiments. For ease of explanation, the drawings referred to below schematically show only those components of the embodiments of the present invention that are necessary to describe the present invention. Accordingly, a display device according to the present invention may include any components that are not shown in any of the drawings referred to herein. The sizes of the components in the drawings do not exactly represent the sizes or size ratios of the actual components.

First Embodiment

FIG. 1 shows a display device 10 of a first embodiment of the present invention. The display device 10 includes a display panel 12, a barrier unit 14 and a backlight 16.

The display panel 12 is a liquid crystal panel. Briefly, the display panel 12 includes an active-matrix substrate 18 having a plurality of pixel electrodes arranged in a matrix, a counter substrate 20 having a common electrode formed thereon, and a liquid crystal layer 22 enclosed between the active-matrix substrate 18 and counter substrate 20. Pixels that include the pixel electrodes are formed. The region where a plurality of pixels are arranged in a matrix constitutes the display region of the display panel 12. In the present embodiment, as shown in FIG. 1, rows of pixels R for displaying right eye images and rows of pixels L for displaying left eye images are arranged in an alternating manner.

In other words, in the present embodiment, right eye images and left eye images are divided into stripes, one stripe for each pixel row. A combined image having such stripes of right and left eye images, arranged in an alternating manner, is displayed on the display panel 12.

Although not shown, one of the active-matrix substrate 18 and counter substrate 20 has a color filter layer formed thereon. This provides each pixel with a color property.

A backlight 16 is located adjacent one of the sides of the display panel 12 that are disposed in a thickness direction thereof. The backlight 16 includes a light source 24 and a reflective unit 26.

In this backlight 26, light emitted by the light source 24 is reflected in the reflective unit 26. As such, the display panel 12 is illuminated with light.

The backlight 16 may be of other types than an edge light backlight as shown in FIG. 1, and may be a direct backlight or a planar light source backlight, for example. The light source 24 of the backlight 16 may be a cold-cathode tube or a light-emitting diode (LED), for example.

A barrier unit 14 is located on the other one of the sides of the display panel 12 that are disposed in a thickness direction thereof. The barrier unit 14 is provided to shield or pass light (i.e. separate illumination light from the backlight 16) and need not be located on the other one of the sides of the display panel 12 that are disposed in a thickness direction thereof. For example, the unit may be located between the display panel 12 and backlight 16.

The barrier unit 14 includes a substrate 28. The substrate 28 may be a glass substrate, for example.

The barrier unit 14 further includes a plurality of light-shielding layers 30. The light-shielding layers 30 may be made of a light-sensitive resin containing a black pigment, for example.

The light-shielding layers 30 are shaped as stripes that correspond to the rows of pixels R and L of the active-matrix substrate 18. In other words, in the barrier unit 14, a translucent slit 32 is formed between two adjacent light-shielding layers 30. That is, the barrier unit 14 includes a parallax barrier 34, which serves as the separating unit, in which the light-shielding layers 30 and translucent slits 32 are arranged in an alternating manner.

Each light-shielding layer 30 is illuminated by the backlight 16 and blocks a portion of light that has passed through the display panel 12. As such, rows of pixels R that display right eye images may be observed by the right eye of the viewer but cannot be observed by the left eye of the viewer. Rows of pixels L that display left eye images may be observed by the left eye of the viewer but cannot be observed by the right eye of the viewer. As a result, the viewer can view stereoscopic images.

The barrier unit 14 further includes a resin layer 36. The resin layer 36 may be an ultraviolet curable resin, for example.

The resin layer 36 is formed on the substrate 28 to cover the light-shielding layers 30. The resin layer 36 allows the barrier unit 14 to adhere to the display panel 12.

In the present embodiment, a polarizer 38a located adjacent the active-matrix substrate 18 is attached to the active-matrix substrate 18, while a polarizer 38b located adjacent the counter substrate 20 is attached to the substrate 28 of the barrier unit 14.

Figure 2:
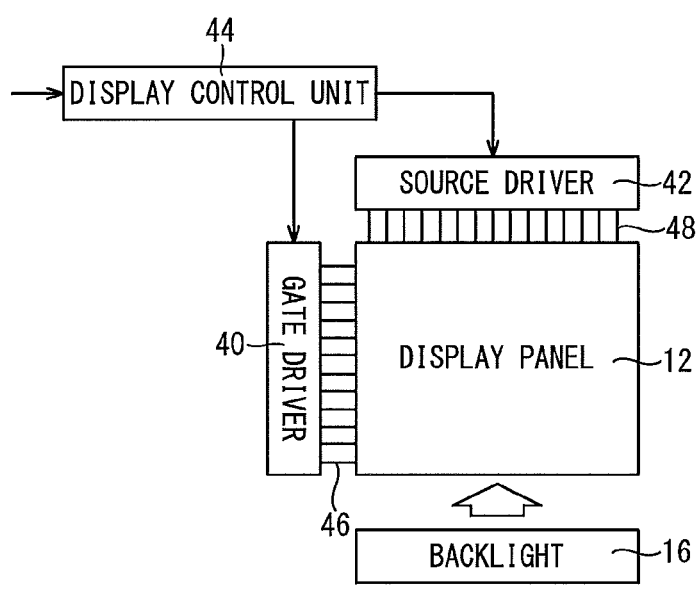
FIG. 2 is a schematic block diagram of an exemplary configuration of the drive control unit of the display device of FIG. 1.

As shown in FIG. 2, the display device 10 includes a gate driver 40, a source driver 42 and a display control unit 44, all of which collectively serve as the drive control unit for the display panel 12.

A plurality of gate lines 46 are connected with the gate driver 40. Each of the gate lines 46 is connected with the gate electrode of a thin-film transistor, which serves as a switching device. Thin-film transistors are formed on the active-matrix substrate 18. Each gate line 46 conveys a scan signal provided by the gate driver 40. Scan signals provided to the gate electrodes drive thin film transistors.

A plurality of source lines 48 are connected with the source driver 42. Each of the source lines 48 is connected with the source electrode of a thin-film transistor. Each source line 48 conveys a display signal provided by the source driver 42. When a display signal is provided to a thin-film transistor that is being driven, a charge specified by the display signal is accumulated in the storage capacitor connected with the thin-film transistor. The storage capacitor is implemented by a pixel electrode connected with the drain electrode of the thin-film transistor, the common electrode located opposite the pixel electrodes, and the liquid crystal layer 22 located between the pixel electrodes and common electrode. Accumulating a charge specified by a display signal in a storage capacitor allows control of the gray scale of the associated pixel. Thus, an image may be displayed on the display panel 12.

The display control unit 44 generates various signals necessary to display an image based on display data signals provided from the outside and timing control signals, and provides those signals to the gate driver 40 and source driver 42. The combined image discussed above is generated by the display control unit 44.

In the present embodiment, the display unit is implemented by the display panel 12 and the drive control unit for the display panel 12 (i.e. the gate driver 40, source driver 42 and display control unit 44).

Figure 3:
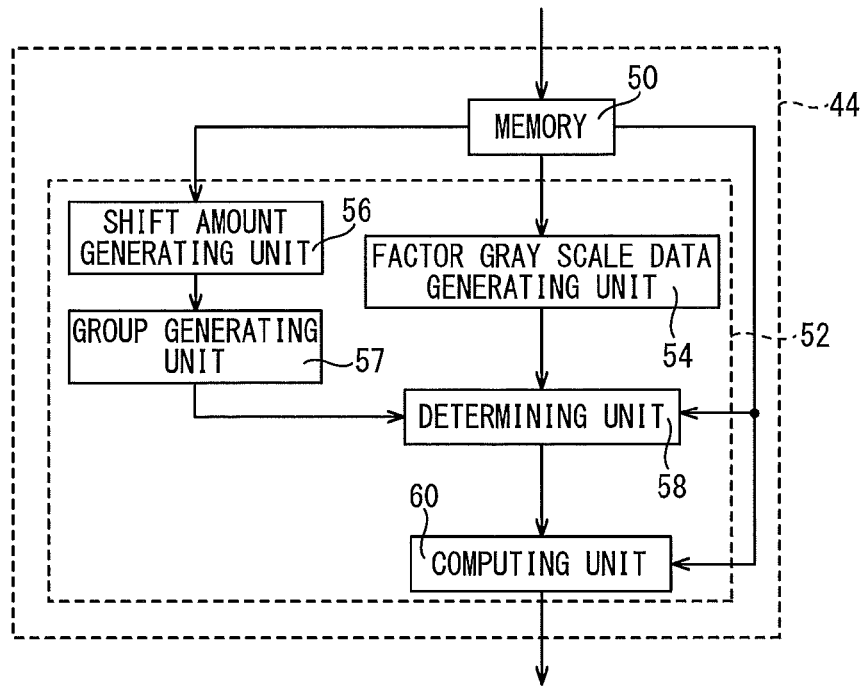
FIG. 3 is a schematic block diagram of an exemplary configuration of the display control unit of FIG. 2.

As shown in FIG. 3, the display control unit 44 includes a memory 50 and a correcting unit 52.

The memory 50 temporarily stores a display data signal provided from the outside. In the present embodiment, only one memory 50 is provided, as shown in FIG. 3; alternatively, for example a memory for temporarily storing a display data signal for displaying a left eye image and a memory for temporarily storing a display data signal for displaying a right eye image may be provided. Alternatively, no memory may be provided.

The correcting unit 52 corrects the gray scale data (the gray scale value in the present embodiment) of a pixel that displays one of the images included in a combined image that the viewer is supposed to view. This reduces crosstalk. Crosstalk is a phenomenon where one of the images included in a combined image that is other than the image that the viewer is supposed to view is visible. Crosstalk may be produced by multiple reflection in layers of the display device 10 or light leakage from a light-shielding layer 30 of the parallax barrier 34, for example.

The correcting unit 52 includes a factor gray scale data generating unit 54, a shift amount generating unit 56, a group generating unit 57, a determining unit 58 and a computing unit 60.

The factor gray scale data generating unit 54 generates factor gray scale data that represents a factor for crosstalk based on the gray scale data of a pixel that displays one of the images included in a combined image that is other than the image that the viewer is supposed to view. Different pixels may be factors for crosstalk depending on, for example, the positional relationship between the light-shielding layers and translucent slits of the parallax barrier. Since the present embodiment includes a parallax barrier 34 having light-shielding layers 30 and translucent slits 32 arranged in an alternating manner from the left to the right on the display screen of the display device 10, pixels located next to a pixel that displays an image that the viewer is supposed to view, to the left and right on the display screen of the display device 10, may be factors for crosstalk. In other words, in the present embodiment, those of the pixels in a matrix that are located next, as viewed in a row direction, to the pixels that display an image that the viewer is supposed to view may be factors for crosstalk.

Figure 4:
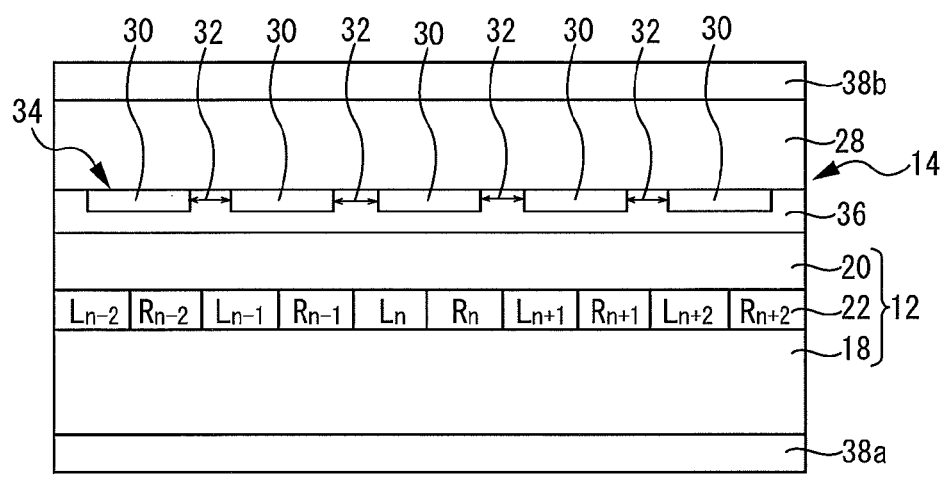
FIG. 4 is a schematic view illustrating pixels that can be factors for crosstalk in the display device of FIG. 1.

For example, regarding the pixel $L_n$ shown in FIG. 4, the pixels $R_{n-1}$ and $R_n$ located next to the pixel $L_n$ may be factors for crosstalk. The factor gray scale data $I'_{Rn}$ used to correct the crosstalk for the pixel Ln may be calculated by the following Equation (2):

$$I'_{Rn} = (I_{Rn-1} + I_{Rn})/2 \qquad (2),$$

where $I_{Rn-1}$ is the gray scale data of the pixel $R_{n-1}$, and $I_{Rn}$ is the gray scale data of the pixel Rn. For example, for 256 gray scale levels, $I_{Rn-1}$ and $I_{Rn}$ are in the range from 0 to 255.

When generating factor gray scale data for a pixel that displays an image that the viewer is supposed to view and that is located at an edge of the display region where the combined image is displayed, the factor gray scale data generating unit 54 supposes gray scale data of a pixel that displays an image other than the image that the viewer is supposed to view and that does not actually exist, and uses the supposed gray scale data to generate factor gray scale data. Gray scale data of a pixel that does not actually exist may be supposed by, for example, dividing, by an appropriate value (for example, 2), the gray scale data of a pixel that displays an image other than the image that the viewer is supposed to view and that actually exists. If there are a plurality of such pixels that actually exist, the average of the gray scale data of these pixels may be divided by an appropriate value.

The shift amount generating unit 56 generates a shift amount for every one of the pixels of one frame. The shift amount is used to increase the gray scale level of a pixel. In the present embodiment, increasing the gray scale level of a pixel means making the pixel brighter. The shift amount for each pixel will be hereinafter referred to as individual shift amount. For example, the individual shift amount for the pixel $L_n$ shown in FIG. 4 may be calculated by the following Equation (3):

$$U_{Ln}=I_{Rn}'\times(C/I_M)-I_{Ln} \qquad (3),$$

where $I_M$ is the maximum value of the gray scale data. For example, for 256 gray scale levels, $I_M$ is 255. $I_{Ln}$ is the gray scale data of the pixel Ln. For example, for 256 gray scale levels, $I_{Ln}$ is in the range from 0 to 255. C is the crosstalk level. For example, for 256 gray scale levels, C is in the range from 0 to 255.

If the result of Equation (3) is negative, 0 is treated as the result of Equation (3) (i.e. the individual shift amount). The value of the individual shift amount being 0 means that the gray scale data of the pixel need not be increased in advance.

The individual shift amount may be calculated by other equations than Equation (3). For example, the individual shift amount may be represented by the difference between the gray scale data $I_{Ln}$ of the pixel $L_n$ and the factor gray scale data $I_{Rn}'$.

Figure 5:
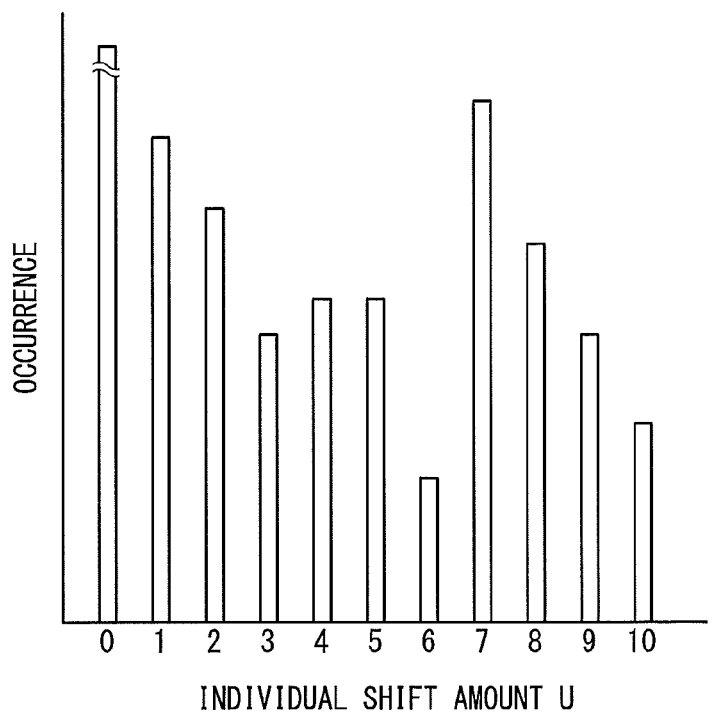
FIG. 5 is a histogram illustrating exemplary individual shift amounts grouped by the group generating unit of FIG. 3.

The group generating unit 57 groups individual shift amounts generated by the shift amount generating unit 56 according to their size. That is, the group generating unit 57 groups the individual shift amounts for one frame according to their size. Exemplary grouped individual shift amounts are shown in FIG. 5 in the form of a histogram. In the histogram of FIG. 5, the horizontal axis indicates the value of individual shift amounts. The vertical axis indicates the proportion of the pixels with an individual shift amount equal to the relevant value to all the pixels of one frame (i.e. the occurrence of a pixel with an individual shift amount equal to the relevant value). The maximum on the horizontal axis is equal to the crosstalk level C of the display device.

The individual shift amounts grouped by the group generating unit 57 are stored in an appropriate region. One frame or a plurality of frames of individual shift amounts (grouped individual shift amounts) may be stored. The region storing the grouped individual shift amounts may be within the group generating unit 57 or outside the group generating unit 57. In other words, a memory storing grouped individual shift amounts (for example, a RAM) may be included in the group generating unit 57 or not included in the group generating unit 57. If the group generating unit 57 includes such a memory, "a storage unit configured to store at least one frame of shift amounts generated by the shift amount generating unit" is implemented by the group generating unit 57. In the present embodiment, the group generating unit 57 includes a memory, not shown, such that "a storage unit configured to store at least one frame of shift amounts generated by the shift amount generating unit" is implemented by the group generating unit 57. If the group generating unit 57 does not include a memory, a memory is provided, for example, between the group generating unit 57 and a shift amount determining unit 66, discussed below.

Figure 6:
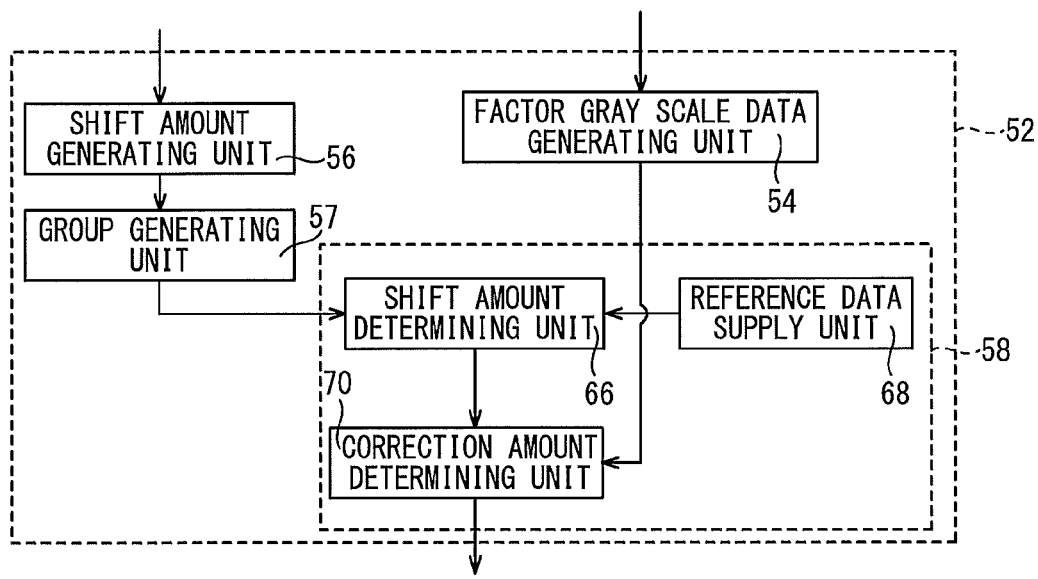
FIG. 6 is a schematic block diagram of an exemplary configuration of the correcting unit of FIG. 3.

The determining unit 58 determines a correction amount used to correct crosstalk. As shown in FIG. 6, the determining unit 58 includes a shift amount determining unit 66, a reference data supply unit 68, and a correction amount determining unit 70.

The shift amount determining unit 66 uses individual shift amounts grouped by the group generating unit 57 and reference data supplied by the reference data supply unit 68 to determine a shift amount. The shift amount determined by the shift amount determining unit 66 will be hereinafter referred to as total shift amount.

The shift amount determining unit 66 determines a total shift amount considering various conditions, such as how much proportion of the region with reduced contrast to the total display region of the display panel 12 is acceptable.

The total shift amount determined by the shift amount determining unit 66 is stored in an appropriate region. The region storing the total shift amount may be within the shift amount determining unit 66, or may be outside the shift amount determining unit 66. One frame or a plurality of frames of total shift amounts may be stored.

The total shift amount determined by the shift amount determining unit 66 may be used to correct the gray scale data of the pixels for the next frame, for example. The total shift amount determined by the shift amount determining unit 66 may be used for other purposes than to correct the gray scale data of the pixels for the next frame. For example, if the individual shift amounts grouped by the group generating unit 57 do not significantly change over a plurality of frames, a new total shift amount need not be determined and the already determined total shift amount may be used.

If the difference between the total shift amount of a previously displayed frame and the total shift amount of a currently displayed frame is large, the shift amount determining unit 66 may generate a total shift amount with an intermediary magnitude between the total shift amount of the previously displayed frame and the total shift amount of the currently displayed frame. This will reduce rapid changes in the correction amount. As such, the viewer may feel less disturbed by the imagery.

The reference data supply unit 68 supplies reference data to be used by the shift amount determining unit 66 to determine a total shift amount. The reference data may be, for example, a reference table having a plurality of combinations of patterns of groups of individual shift amounts (i.e. histogram shapes) and total shift amounts corresponding to the patterns of groups of individual shift amounts.

The correction amount determining unit 70 uses the factor gray scale data generated by the factor gray scale data generating unit 54 and the total shift amount determined by the shift amount determining unit 66 to determine a correction amount. For example, the correction amount $D_{Ln}$ used to correct the crosstalk for the pixel $L_n$ shown in FIG. 4 may be calculated by the following Equation (4):

$$D_{Ln}=\{U\times(I_M-I_{Ln})-K\times(I'_{Rn}+1)\}/(I_M+1) \qquad (4),$$

where K is the crosstalk level C plus 1, and U is the total shift amount.

For some individual shift amounts grouped by the group generating unit 57, the shift amount determining unit 66 may determine a total shift amount equal to the crosstalk level. For example, if $I'_{Rn}=I_M$ for the entire combined image and $I_{Ln}=0$, the result of Equation (3) for every one of the pixels that display the combined image is C. In this case, the shift amount determining unit 66 determines a total shift amount equal to the crosstalk level.

Thus, if the shift amount determining unit 66 determines a total shift amount equal to the crosstalk level, the correction amount $D_{Ln}$ used to correct the crosstalk for the pixel $L_n$ shown in FIG. 4, for example, may be calculated by the following Equation (5):

$$D_{Ln}=K\times(I_M-I_{Ln}-I'_{Rn}-1)/(I_M+1) \qquad (5).$$

The computing unit 60 (see FIG. 3) uses the correction amount determined by the determining unit 58 to correct the gray scale data of the pixel. For example, the gray scale data $Io_{Ln}$, after correction, of the pixel Ln shown in FIG. 4 may be calculated by the following Equation (6):

$$Io_{Ln} = I_{Ln} + D_{Ln} \qquad (6).$$

If each pixel has a plurality of sub-pixels (for example, a red pixel, a green pixel and a blue pixel), then, factor gray scale data, an individual shift amount, a correction amount and gray scale data after correction are generated for each sub-pixel.

The above Equations (2) to (6) are applicable to situations where the gray scale data of a pixel L that displays a left eye image is to be corrected; for situations where the gray scale data of a pixel R that displays a right eye image is to be corrected, R and L may be switched in Equations (2) to (6). Accordingly, no detailed description is given for situations where the gray scale data of a pixel R that displays a right eye image is to be corrected.

To clarify what Equation (6) means, it will be described how Equation (6) was determined.

First, if the crosstalk rate is denoted by F, the gray scale data of a pixel for the left eye may be represented by the following Equation (7):

$$I_L + (F \times I_R) \qquad (7),$$

where $I_L$ denotes a portion of the gray scale data of a pixel for the left eye that is caused by the gray scale data $I_L$ of the pixel L that displays a left eye image. $F \times I_R$ denotes a portion of the gray scale data of a pixel for the left eye that is caused by crosstalk. That is, $F \times I_R$ represents the gray scale data $I_R$ of the pixel R that displays a right eye image multiplied by the crosstalk rate F. F is in the range from 0 to 1.

F varies for each display device 10 depending on, for example, the distance between two adjacent light-shielding layers 30 in the parallax barrier 34, the shape of the light-shielding layers 30, the material of the light-shielding layers 30, the locations of the light-shielding layers 30, the width of the light-shielding layers 30, the thickness of the light-shielding layers 30, and the positional relationship between the light-shielding layers 30 and the pixels R and L. F may be obtained by measurements for each display device 10. F may be obtained by, for example, measuring the luminance of the pixels for the left eye when the pixels that display a left eye image are blackened and the pixels that display a right eye image are whitened, and measuring the luminance of the pixels for the left eye when both the pixels that display a left eye image and the pixels that display a right eye image are blackened, and using the difference between these luminances for calculation.

F may be represented as $C/I_M$. If F is represented as $C/I_M$, Equation (7) becomes:

$$I_L + (C/I_M) \times I_R \qquad (7').$$

To correct the gray scale data of a pixel for the left eye, as represented by Equation (7'), correction must be done according to the following Equation (8). Here, the effects of crosstalk are subtracted in advance such that the gray scale data that has been affected by crosstalk is equal to the intended gray scale data.

$$I_L - (C/I_M) \times I_R + (C/I_M) \times I_R = I_L \qquad (8).$$

Thus, the gray scale data after correction may be represented by the following Equation (9):

$$I_L - (C/I_M) \times I_R \qquad (9).$$

Here, the gray scale level must be increased by U in advance to prevent the gray scale data after correction from being negative. In other words, the range of the gray scale data must be changed such that it is in the range from U to $I_M$. For example, for 256 gray scale levels, the range of the gray scale data must be changed such that it is in the range from U to 255.

The shift amount U used to change the range of the gray scale data such that it is in the range from U to $I_M$ may be represented by the following Equation (10):

$$U = I_R \times (C/I_M) - I_L \qquad (10).$$

If $I_L$ increased by U is denoted by Ib, Ib may be represented by the following Equation (11):

$$Ib = I_L((I_M - U)/I_M) + U \qquad (11).$$

Thus, Io, the gray scale data after correction, may be calculated by substituting Ib of Equation (11) for $I_L$ of Equation (9) to give the following Equation (12):

$$Io = Ib - (C/I_M) \times I_R = (I_M \times I_L + U \times (I_M - I_L) - C \times I_R)/I_M \qquad (12).$$

Here, to avoid complicated circuitry for hardware calculation, Equation (12) may be approximated to give:

$$Io + 1 = ((I_M + 1) \times (I_L + 1) + U \times ((I_M + 1) - (I_L + 1)) - (C + 1) \times (I_R + 1))/(I_M + 1) \qquad (12').$$

The approximation of Equation (12) may be done by adding 1 to Io, $I_M$, $I_L$ and $I_R$. 1 is not added to the shift amount U.

In Equation (12'), C+1 may be represented by K to give:

$$Io + 1 = ((I_M + 1) \times (I_L + 1) + U \times ((I_M + 1) - (I_L + 1)) - K \times (I_R + 1))/(I_M + 1) \qquad (13).$$

Thus, to calculate Io using Equation (13), the following equation may be used:

$$Io = I_L + \{U \times (I_M - I_L) - K \times (I_R + 1)\}/(I_M + 1) \qquad (14).$$

If the gray scale level is increased by U in advance, the gray scale data after correction computed by the computing unit 60 is represented by Equation (14). The correction amount determined by the determining unit 58 is represented by the second term of Equation (14). The factor gray scale data generated by the factor gray scale data generating unit 54 is denoted by $I_R$ contained in the second term of Equation (14). The shift amount determined by the shift amount determining unit 66 is denoted by U contained in the second term of Equation (14).

Since for 256 gray scale levels, $I_M + 1$ is 256, Equation (14) may also be expressed as:

$$Io = I_L + \{U \times (I_M - I_L) - K \times (I_R + 1)\} >> 8 \qquad (15).$$

In Equation (15), ">>8" means a decrementing 8 bit shift (i.e. a division of 256).

To prevent the result of Equation (9) from being negative, the gray scale level may be increased by C in advance such that Ib may be represented by the following Equation (16):

$$Ib = I_L \times ((I_M - C)/I_M) + C \qquad (16).$$

Thus, Ib of Equation (16) may be substituted for $I_L$ of Equation (9) such that the gray scale data Io after correction may be represented by the following Equation (17):

$$Io = (I_M \times I_L - C \times I_L - C \times I_R)/I_M + C \qquad (17).$$

To avoid complicated circuitry for hardware calculation, Equation (17) may be approximated to give:

$$Io + 1 = ((I_M + 1) \times (I_L + 1) - (C + 1) \times (I_L + 1) - (C + 1) \times (I_R + 1))/(I_M + 1) + C + 1 \qquad (17').$$

The approximation of Equation (17) may be done by adding 1 to Io, $I_M$, $I_L$, $I_R$ and C.

In Equation (17'), C+1 may be represented by K to give:

$$Io + 1 = I_L + 1 + K \times (I_M - I_L - I_R - 1)/(I_M + 1) \qquad (18).$$

Thus, to calculate Io using Equation (18), the following equation may be used:

$$Io = I_L + K \times (I_M - I_L - I_R - 1)/(I_M + 1) \quad (19).$$

That is, if the gray scale level is increased by C in advance, the gray scale data after correction computed by the computing unit 60 is represented by Equation (19). The correction amount determined by the determining unit 58 is represented by the second term of Equation (19). The factor gray scale data generated by the factor gray scale data generating unit 54 is denoted by $I_R$ contained in the second term of Equation (19).

Since for 256 gray scale levels, $I_M + 1$ is 256, Equation (19) may also be expressed as:

$$Io = I_L + K \times (I_M - I_L - I_R - 1) >> 8 \quad (20).$$

In Equation (20), ">>8" means a decrementing 8 bit shift (i.e. a division of 256).

If the value of K is limited to powers of 2, i.e. $K = 2^n$, the multiplication by K may be incorporated in the bit shift such that the calculation may be simplified. As such, the calculation only requires an addition, subtractions and a shift to the right. This gives the following Equation (20'):

$$Io = I_L + (I_M - I_L - I_R - 1) >> (8 - n) \quad (20').$$

The above Equations (7) to (20') may be used to correct the gray scale data of a pixel L that displays a left eye image; to correct the gray scale data of a pixel R that displays a right eye image, R and L may be switched in Equations (7) to (20'). Accordingly, no detailed description of correcting the gray scale data of a pixel R that displays a right eye image is given.

Correcting the gray scale data of each pixel in this manner will allow optimum crosstalk correction while minimizing the reduction in contrast. As such, the display quality may be further improved.

In the present embodiment, a total shift amount is determined from a pattern of groups of individual shift amounts. Thus, an appropriate total shift amount may be provided. As such, an appropriate correction amount may be provided.

In the present embodiment, different equations are used to determine the correction amount depending on the pattern of groups of individual shift amounts. Thus, a more appropriate correction amount may be provided.

In the present embodiment, crosstalk correction is done considering the gray scale data of the pixels located next to a pixel that displays an image that the viewer is supposed to view, to the left and right. As such, appropriate crosstalk correction is possible.

In the present embodiment, the factor gray scale data is the average of the gray scale data of the pixels located next to a pixel that displays an image that the viewer is supposed to view, to the left and right, allowing the factor gray scale data to be generated in a simple manner.

Application Example 1 of First Embodiment

In the present application example, the factor gray scale data I'RN used to correct crosstalk for the pixel $L_n$ shown in FIG. 4 may be calculated by the following Equation (21):

$$I'_{Rn} = A_{n-1} \times I_{Rn-1} + A_n \times I_{Rn} \quad (21),$$

where $A_{n-1}$ is the rate of contribution of the pixel $R_{n-1}$ to crosstalk. $A_n$ is the rate of contribution of the pixel Rn to crosstalk. $A_{n-1}$ and $A_n$ are in the range from 0 to 1.

$A_{n-1}$ and $A_n$ vary for each display device depending on, for example, the distance between two adjacent light-shielding layers 30 in the parallax barrier 34, the shape of the light-shielding layers 30, the material of the light-shielding layers 30, the locations of the light-shielding layers 30, the width of the light-shielding layers 30, the thickness of the light-shielding layers 30, and the positional relationship between the light-shielding layers 30 and the pixels R and L. $A_{n-1}$ and $A_n$ may be obtained by measurements for each display device. These values may be obtained by, for example, measuring the luminance of the pixels for the left eye when all the pixels (pixel $L_n$, pixel Rn and pixel $R_{n-1}$) are blackened, and the luminance of the pixels for the left eye when the pixels that are being measured are whitened and the other pixels are blackened, and using the difference between these luminances for calculation.

The above Equation (21) may be used to correct the gray scale data of a pixel L that displays a left eye image; to correct the gray scale data of a pixel R that displays a right eye image, R and L may be switched in Equation (21). Accordingly, no detailed description of correcting the gray scale data of a pixel R that displays a right eye image is given.

In the present Application Example, the factor gray scale data may be calculated using the rate of contribution to crosstalk of the pixels located next to a pixel that displays an image that the viewer is supposed to view. Thus, more appropriate factor gray scale data may be obtained than in implementations where the factor gray scale data is calculated supposing that the rates of contribution to crosstalk of the pixels located next to a pixel that displays an image that the viewer is supposed to view are the same, as in the first embodiment. As such, crosstalk may be corrected still more precisely.

Application Example 2 of First Embodiment

Figure 7:
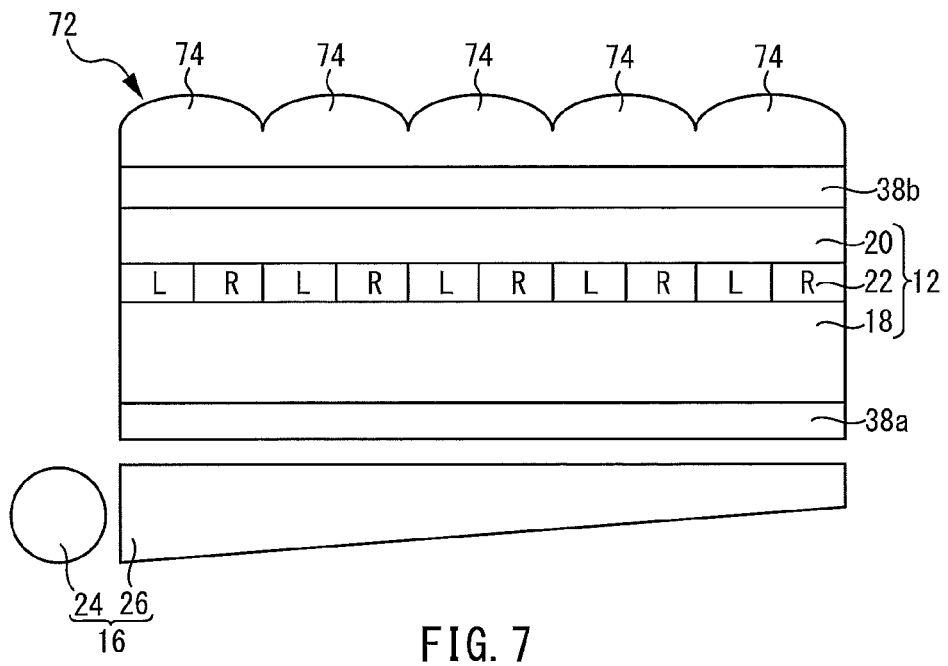
FIG. 7 is a schematic view of an exemplary configuration of a display device of Application Example 2 of the first embodiment of the present invention.

In the present application example, the barrier unit 14 is replaced by a lenticular lens 72 that serves as the separating unit, as shown in FIG. 7. The lenticular lens 72 includes a plurality of cylindrical lenses 74 aligned with rows of pixels R and rows of pixels L arranged in an alternating manner. The lenticular lens 72 is attached to the polarizer 38b adjacent the counter substrate 20 such that each cylindrical lens 74 corresponds to a row of pixels R or L. In the present application example, the polarizer 38b located adjacent the counter substrate 20 is attached to the counter substrate 20.

Application Example 3 of First Embodiment

Figure 8:
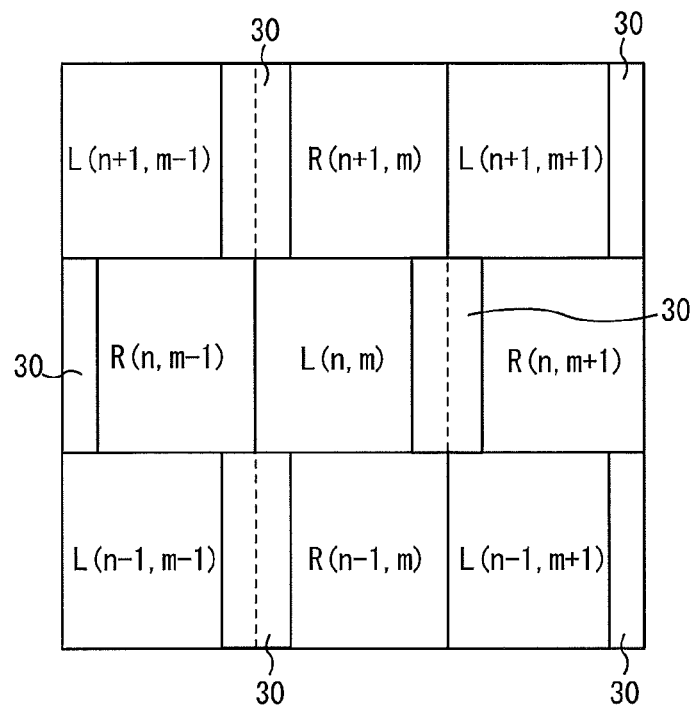
FIG. 8 is a plan view illustrating the positional relationship between pixels and light-shielding layers included in a display device of Application Example 3 of the first embodiment of the present invention.

In the present application example, a pixel R and a pixel L may be located next to each other not only to the left and right on the display panel 12, but also to the top and bottom on the display panel 12, as shown in FIG. 8. A light-shielding layer 30 forms a gap that is as large as one pixel as measured in the top-to-bottom direction on the display panel 12.

Arranging the pixels R and L and light-shielding layers 30 in this manner makes the light-shielding layers 30 less visible than in implementations where the light-shielding layers 30 are shaped as stripes.

In the present application example, not only the pixels located next to the relevant pixel to the left and to the right on the display panel 12, but also the pixels located next to the relevant pixel to the top and to the bottom on the display panel 12 may be factors for crosstalk. For example, for the pixel L (n, m) shown in FIG. 6, the pixel R (n, m−1) and the pixel R (n, m+1), which are located next to the above pixel to the left and to the right on the display panel 12, respectively, as well as the pixel R (n+1, m) and the pixel R (n−1, m) located next to the above pixel to the top and to the bottom on the display panel 12, respectively, may be factors for crosstalk. The factor gray scale data I'$_R$ used to correct crosstalk for the pixel L (n, m) may be calculated by the following Equation (22):

$$I'_R = (I_R(n, m-1) + I_R(n, m+1) + I_R(n+1, m) + I_R(n-1, m))/4 \quad (22),$$

where $I_R$(n, m−1) is the gray scale data of the pixel R (n, m−1); $I_R$(n, m+1) is the gray scale data of the pixel R (n, m+1); $I_R$(n+1, m) is the gray scale data of the pixel R (n+1, m); and $I_R$(n−1, m) is the gray scale data of the pixel R (n−1, m).

The factor gray scale data I'$_R$ used to correct crosstalk for the pixel L (n, m) may also be calculated by the following equation (23):

$$I'_R = A(n, m-1) \times I_R(n, m-1) + A(n, m+1) \times I_R(n, m+1) + A(n+1, m) \times I_R(n+1, m) + A(n-1, m) \times I_R(n-1, m) \quad (23),$$

where A(n, m−1) is the rate of contribution of the pixel R (n, m−1) to crosstalk; A(n, m+1) is the rate of contribution of the pixel R (n, m+1) to crosstalk; A(n+1, m) is the rate of contribution of the pixel R (n+1, m) to crosstalk; and A(n−1, m) is the rate of contribution of the pixel R (n−1, m) to crosstalk. A(n, m−1), A(n, m+1), A(n+1, m) and A(n−1, m) are in the range from 0 to 1.

A(n, m−1), A(n, m+1), A(n+1, m) and A(n−1, m) vary for each display device depending on, for example, the distance between two adjacent light-shielding layers 30, the shape of the light-shielding layers 30, the material of the light-shielding layers 30, the locations of the light-shielding layers 30, the width of the light-shielding layers 30, the thickness of the light-shielding layers 30, and the positional relationship between the light-shielding layers 30 and the pixels R and L. A(n, m−1), A(n, m+1), A(n+1, m) and A(n−1, m) may be obtained by measurements for each display device. These values may be obtained by, for example, measuring the luminance of the pixels for the left eye when all the pixels (the pixel L(n, m), pixel R(n, m−1), pixel R(n, m+1), pixel R(n+1, m) and pixel R(n−1, m)) are blackened and the luminance of the pixels for the left eye when the pixels that are being measured are whitened and the other pixels are blackened, and using the difference between these luminances for calculation.

The above Equations (22) and (23) may be used to correct the gray scale data of a pixel L that displays a left eye image; to correct the gray scale data of a pixel R that displays a right eye image, R and L may be switched in Equations (22) and (23). Accordingly, no detailed description of correcting the gray scale data of a pixel R that displays a right eye image is given.

Application Example 4 of First Embodiment

In the present application example, the correction amount is calculated by Equation (5) regardless of the pattern of groups of individual shift amounts. The shift amount determining unit 66 does not determine a total shift amount U, and instead determines a crosstalk level C. In such implementations, the crosstalk level C need not be measured in advance.

Second Embodiment

Next, a display device according to a second embodiment of the present invention will be described. In this second embodiment and the third to eighth embodiments below, components and portions similar to those of the first embodiment are labeled with the same characters as those of the first embodiment in the drawings, and their detailed description will not be given.

Figure 9:
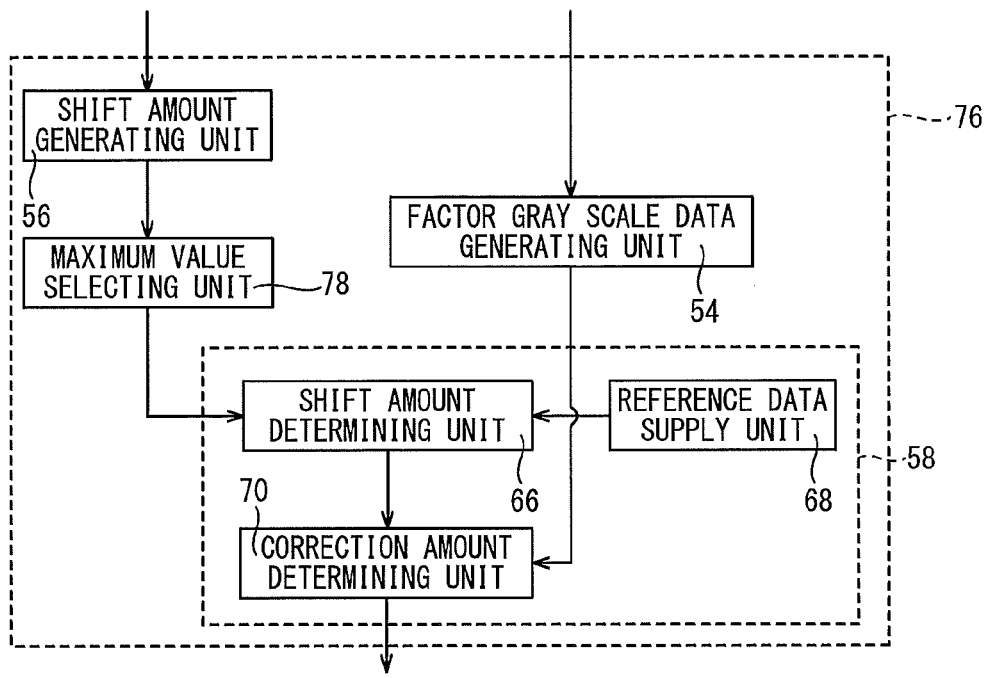
FIG. 9 is a schematic block diagram of an exemplary configuration of a correcting unit included in a display device of a second embodiment of the present invention.

The display device of the present embodiment is different from the display device 10 of the first embodiment in its correcting unit. As shown in FIG. 9, the correcting unit 76 of the present embodiment as compared with the correcting unit 52 of the first embodiment does not include the group generating unit 57, and instead includes a maximum value selecting unit 78.

The maximum value selecting unit 78 selects the one of the individual shift amounts generated by the shift amount generating unit 56 that has the largest value. The shift amount determining unit 66 determines a total shift amount using the individual shift amount selected by the maximum value selecting unit 78 and reference data supplied by the reference data supply unit 68. The reference data supplied by the reference data supply unit 68 may be, for example, a reference table having a plurality of combinations of maximum values of individual shift amounts and the total shift amounts corresponding to the maximum values of the individual shift amounts.

Third Embodiment

Figure 10:
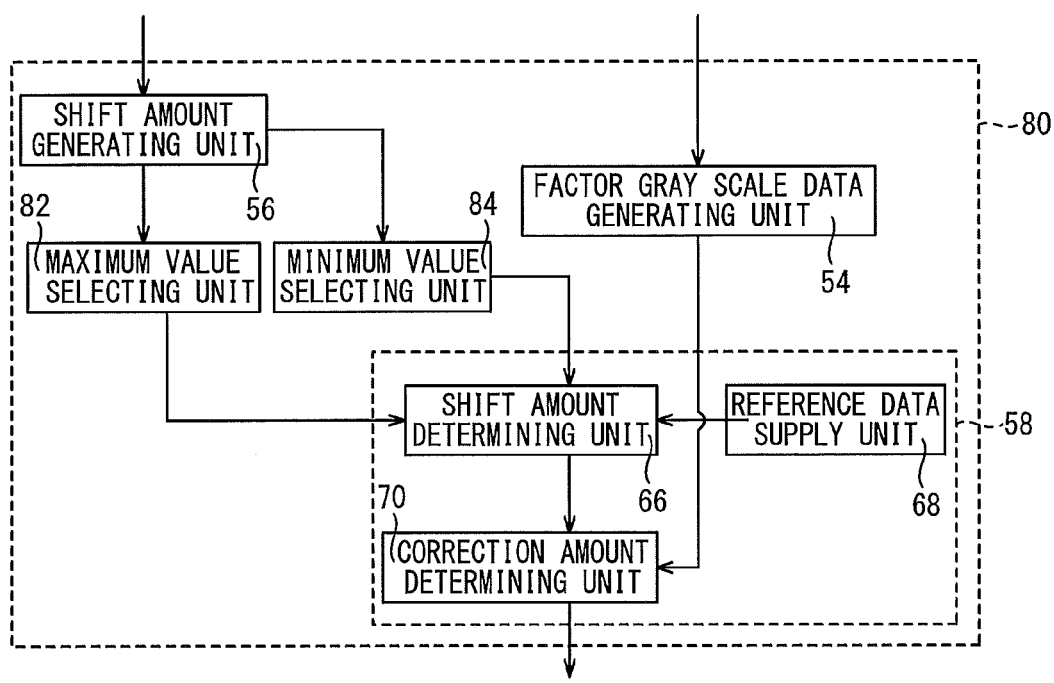
FIG. 10 is a schematic block diagram of an exemplary configuration of a correcting unit included in a display device of a third embodiment of the present invention.

The display device of the present embodiment is different from the display device 10 of the first embodiment in its correcting unit. As shown in FIG. 10, the correcting unit 80 of the present embodiment as compared with the correcting unit 52 of the first embodiment does not include the group generating unit 57, and instead includes a maximum value selecting unit 82 and a minimum value selecting unit 84.

The maximum value selecting unit 82 selects the one of the individual shift amounts generated by the shift amount generating unit 56 that has the largest value. The minimum value selecting unit 84 selects the one of the individual shift amounts generated by the shift amount generating unit 56 that has the smallest value. The shift amount determining unit 66 determines a total shift amount using the individual shift amount selected by the maximum value selecting unit 82, the individual shift amount selected by the minimum value selecting unit 84 and reference data supplied by the reference data supply unit 68. The reference data supplied by the reference data supply unit 68 may be, for example, a reference table having a plurality of combinations of combinations of maximum values and minimum values of individual shift amounts and total shift amounts corresponding to those combinations of maximum values and minimum values of individual shift amounts.

In the present embodiment, a total shift amount is determined using the maximum and minimum values of individual shift amounts. As such, a more appropriate total shift amount may be obtained than in implementations where a total shift amount is determined using only a maximum value of individual shift amounts.

Fourth Embodiment

Figure 11:
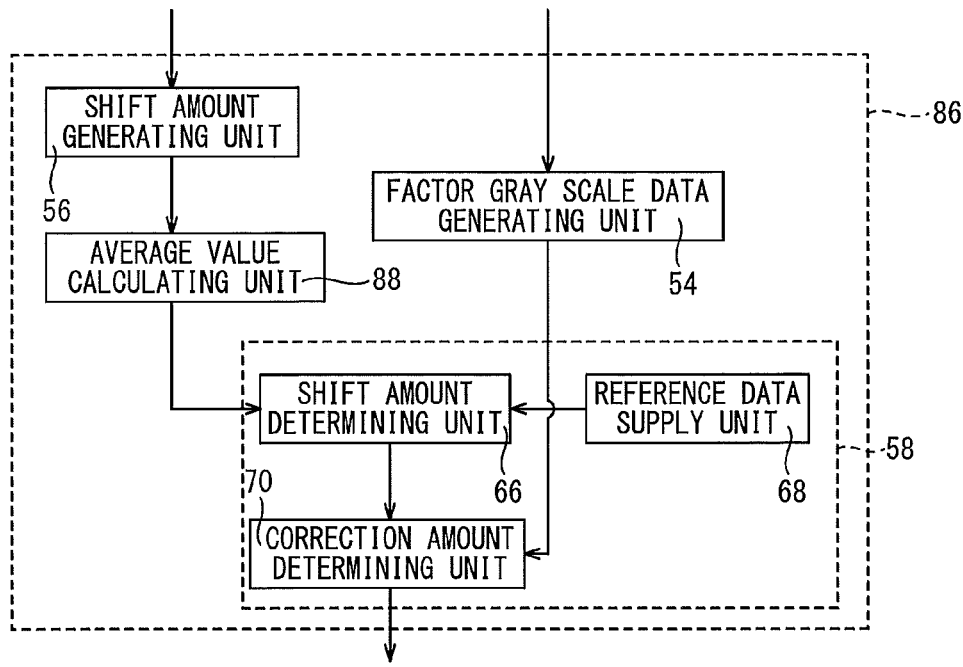
FIG. 11 is a schematic block diagram of an exemplary configuration of a correcting unit included in a display device of a fourth embodiment of the present invention.

The display device of the present embodiment is different from the display device 10 of the first embodiment in its correcting unit. As shown in FIG. 11, the correcting unit 86 of the present embodiment as compared with the correcting unit 52 of the first embodiment does not include the group generating unit 57, and instead includes an average value calculating unit 88.

The average value calculating unit 88 calculates the average value of the individual shift amount generated by the shift amount generating unit 56. The shift amount generating unit 66 determines a total shift amount using the average value of the individual shift amount and reference data supplied by the reference data supply unit 68. The reference data supplied by the reference data supply unit 68 may be, for example, a reference table having a plurality of combinations of average values of individual shift amounts and total shift amounts corresponding to the average values of individual shift amounts.

Fifth Embodiment

Figure 12:
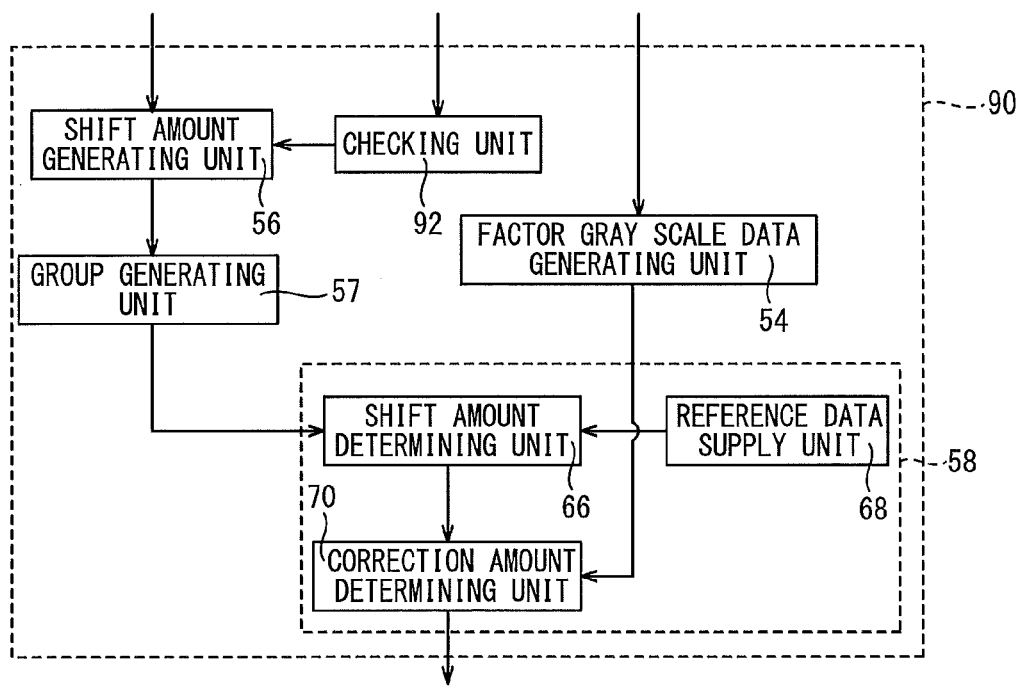
FIG. 12 is a schematic block diagram of an exemplary configuration of a correcting unit included in a display device of a fifth embodiment of the present invention.

The display device of the present embodiment is different from the display device 10 of the first embodiment in its correcting unit. As shown in FIG. 12, the correcting unit 90 of the present embodiment as compared with the correcting unit 52 of the first embodiment further includes a checking unit 92.

The checking unit 92 checks the region of the display panel 12 where a combined image is displayed. The region of the display panel 12 where a combined image is displayed may be checked using a signal provided from the outside, for example. For example, if a combined image is being displayed in a window that can be moved within the display screen of the display device, the display region for the combined image may be checked based on a signal indicating the position of the window in the display screen of the display device. Alternatively, if a black stripe extends along each of the top and bottom edges of the display screen from the left to the right on the display screen, such as in movie contents, the display region for the combined image may be checked based on a signal indicating that the region excepting the black stripes is the display region for the combined image. In implementations with black stripes, the region where the black stripes are displayed (i.e. the region with a pixel gray scale level of 0) may be calculated from the pixel gray scale data, and the result may be used to determine the display region for the combined image.

The shift amount generating unit 56 generates an individual shift amount based on the result of checking by the checking unit 92. Thus, in implementations where a combined image is only displayed in a portion of the display screen of the display device, the pattern of groups of individual shift amounts generated by the group generating unit 57 may be more appropriate than in implementations where an individual shift amount is generated based on all the pixels over the display screen. As such, a more appropriate total shift amount may be provided.

Sixth Embodiment

Figure 13:
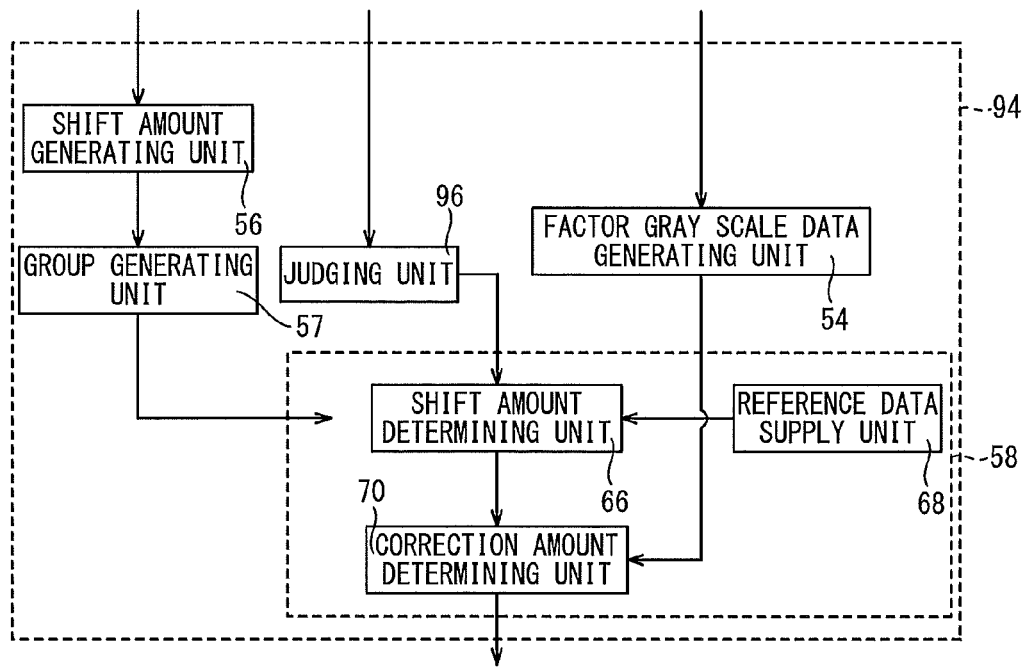
FIG. 13 is a schematic block diagram of an exemplary configuration of a correcting unit included in a display device of a sixth embodiment of the present invention.

The display device of the present embodiment is not a stereoscopic display device, but a display device that displays different images in a plurality of directions using a common display screen. The display device of the present embodiment is different from the display device 10 of the first embodiment in its correcting unit. As shown in FIG. 13, the correcting unit 94 of the present embodiment, as compared with the correcting unit 52 of the first embodiment, further includes a judging unit 96.

The judging unit 96 judges whether each of the images included in a combined image is a still image or a dynamic image. It may be judged whether each of the images included in a combined image is a still image or a dynamic image based on a signal provided from the outside, for example.

The shift amount determining unit 66 determines a total shift amount using a pattern of groups of individual shift amounts, reference data supplied by the reference data supply unit 68 and the type of image (a dynamic image or a still image). The reference data supplied by the reference data supply unit 68 may be, for example, a reference table having a plurality of combinations of combinations of patterns of groups of individual shift amounts and types of images, and total shift amounts corresponding to these combinations.

If the images included in a combined image are dynamic images, the type of image may be determined considering, for example, the speed of an object being viewed in the dynamic images. For example, in the context of car navigation systems, navigation images as viewed from the driver's seat may have an indication of the current position of the car, which changes gradually, while contents as viewed from the passenger's seat may have images that are rapidly changed. In such implementations, a more precise type of image may be determined. As such, a more appropriate total shift amount may be provided.

Seventh Embodiment

Figure 14:
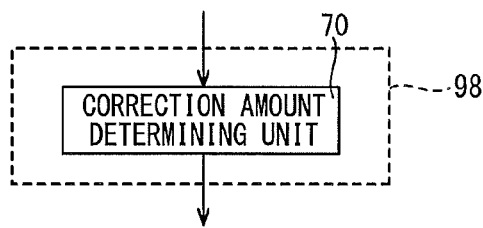
FIG. 14 is a schematic block diagram of an exemplary configuration of a determining unit included in a display device of a seventh embodiment of the present invention.

The display device of the present embodiment as compared with the display device 10 of the first embodiment does not include the shift amount generating unit 56 and the group generating unit 57. The display device of the present embodiment is different from the display device 10 of the first embodiment in its determining unit. As shown in FIG. 14, the determining unit 98 of the present embodiment as compared with the determining unit 58 of the first embodiment does not include the shift amount determining unit 66 and the reference data supply unit 68.

The correction amount determining unit 70 determines a correction amount using a predetermined total shift amount and a predetermined crosstalk level. Thus, the load on the system for displaying images on the display panel 12 may be reduced over implementations where an individual shift amount generated for each pixel is used.

Eighth Embodiment

Figure 15:
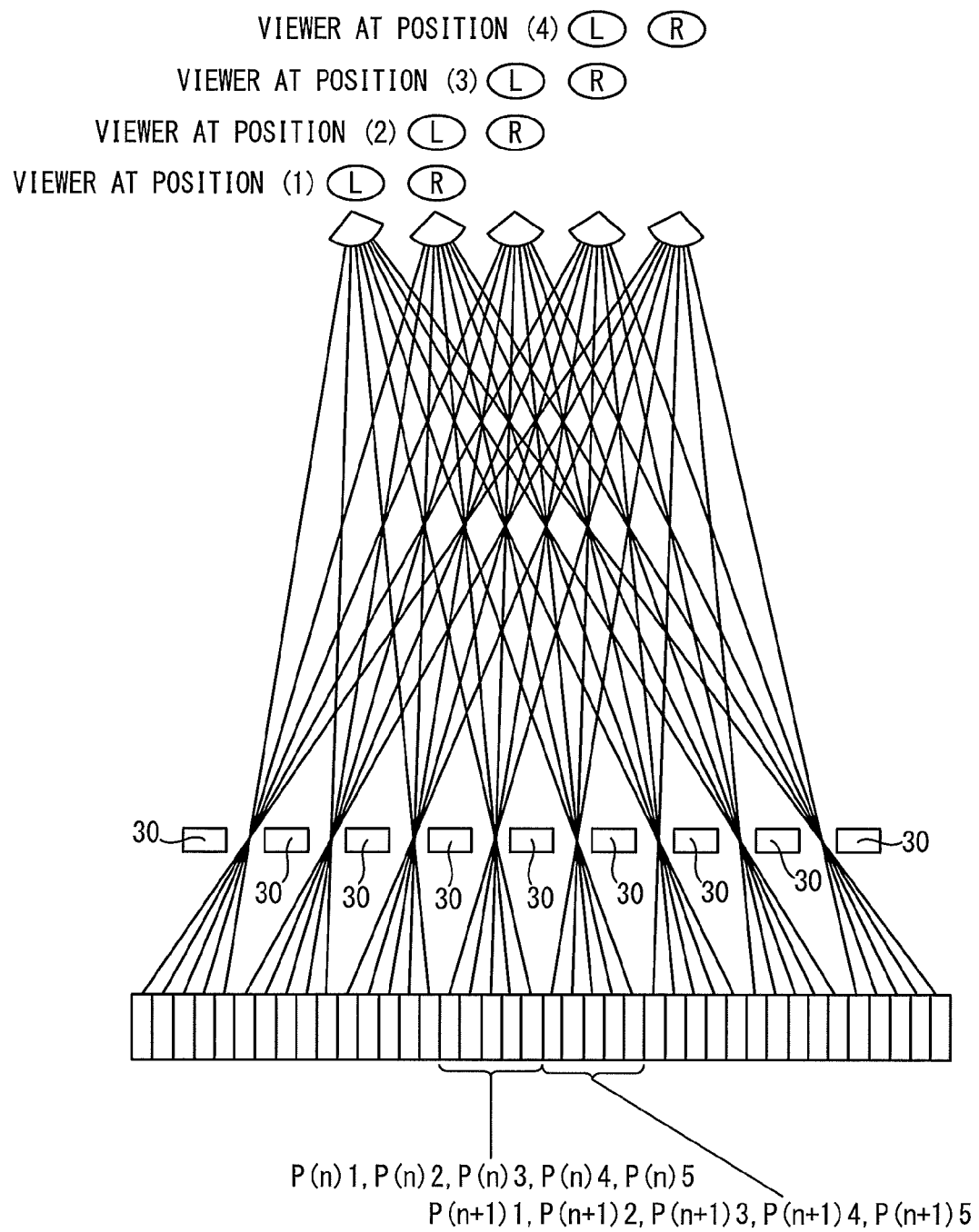
FIG. 15 is a schematic view of an exemplary configuration of main components of a display device of an eighth embodiment of the present invention.

The display device of the present embodiment is different from the display device 10 of the first embodiment in the number of viewpoints. While the display device 10 of the first embodiment is a stereoscopic display device for one viewpoint, the display device of the present embodiment is a stereoscopic display device for four viewpoints, as shown in FIG. 15.

The left eye of a viewer at position (1) views an image displayed by the pixel P(n±*)5. The right eye of the viewer at position (1) and the left eye of a viewer at position (2) view an image displayed by the pixel P(n±*)4. The right eye of the viewer at position (2) and the left eye of a viewer at position (3) view an image displayed by the pixel P(n±*)3. The right eye of the viewer at position (3) and the left eye of a viewer at position (4) view an image displayed by the pixel P(n±*)2. The right eye of the viewer at position (4) views an image displayed by the pixel P(n±*)1. In the indications of the pixels, "*" represents 0 or any natural number.

A viewer observing an image displayed in a specified direction recognizes an image displayed in a direction different from the specified direction as crosstalk. For example, if the left eye of a viewer at position (1) shown in FIG. 15 views an image other than the left eye images for position (1), it recognizes that image as crosstalk. If the right eye of the viewer at position (1) shown in FIG. 15 views an image other than the right eye images for position (1), it recognizes that image as crosstalk.

In the present embodiment, for a given pixel, the four pixels located to the left of the given pixel and the four pixels located to the right of the given pixel can be factors for crosstalk. For example, for the pixel P(n)5 shown in FIG. 15, the four pixels located to the left of the pixel P(n)5, i.e. P(n)1, P(n)2, P(n)3 and P(n)4 as well as the four pixels located to the right of the pixel P(n)5, i.e. P(n+1)1, P(n+1)2, P(n+1)3 and P(n+1)4 may be factors for crosstalk. The factor gray scale data I'$_n$5 used to correct crosstalk for the pixel P(n)5 may be calculated by the following Equation (24):

$$I'(n)5 = A(n)1 \times I(n)1 + A(n)2 \times I(n)2 + A(n)3 \times I(n)3 + A(n)4 \times I(n)4 + A(n+1)1 \times I(n+1)1 + A(n+1)2 \times I(n+1)2 + A(n+1)3 \times I(n+1)3 + A(n+1)4 \times I(n+1)4 \quad (24),$$

where A(n)1 denotes the rate of contribution of the pixel P(n)1 to crosstalk; A(n)2 denotes the rate of contribution of the pixel P(n)2 to crosstalk; A(n)3 denotes the rate of contribution of the pixel P(n)3 to crosstalk; A(n)4 denotes the rate of contribution of the pixel P(n)4 to crosstalk; A(n+1)1 denotes the rate of contribution of the pixel P(n+1)1 to crosstalk; A(n+1)2 denotes the rate of contribution of the pixel P(n+1)2 to crosstalk; A(n+1)3 denotes the rate of contribution of the pixel P(n+1)3 to crosstalk; and A(n+1)4 denotes the rate of contribution of the pixel P(n+1)4 to crosstalk.

A(n)1, A(n)2, A(n)3, A(n)4, A(n+1)1, A(n+1)2, A(n+1)3 and A(n+1)4 vary for each display device depending on, for example, the distance between two adjacent light-shielding layers 30, the shape of the light-shielding layers 30, the material of the light-shielding layers 30, the locations of the light-shielding layers 30, the width of the light-shielding layers 30, the thickness of the light-shielding layers 30, and the positional relationship between the light-shielding layers 30 and the relevant pixels. A(n)1, A(n)2, A(n)3, A(n)4, A(n+1)1, A(n+1)2, A(n+1)3 and A(n+1)4 may be obtained by measurements for each display device. These values may be obtained by, for example, measuring the luminance of the pixels for the left eye when all the pixels (the pixels P(n)1, P(n)2, P(n)3, P(n)4, P(n)5, P(n+1)1, P(n+1)2, P(n+1)3, and P(n+1)4) are blackened and the luminance of the pixels for the left eye when the pixels that are being measured are whitened and the other pixels are blackened, and using the difference between these luminances for calculation.

The above Equation (24) is used to correct the gray scale data of the pixel P(n)5; for other pixels, the gray scale data may be corrected in a manner similar to that for the pixel P(n)5. Thus, no detailed description for correcting the gray scale data of other pixels is given.

Ninth Embodiment

Figure 16:
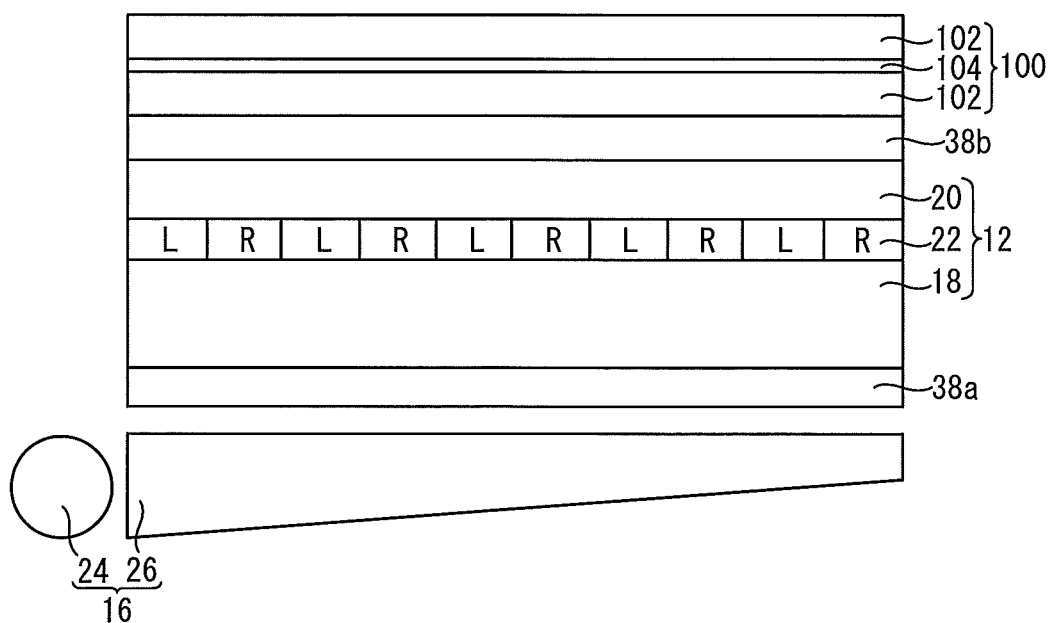
FIG. 16 is a schematic view of an exemplary configuration of a display device of a ninth embodiment of the present invention.

The present embodiment includes a liquid crystal panel 100 instead of the barrier unit 14, as shown in FIG. 16. In the liquid crystal panel 100, a liquid crystal layer 104 is enclosed between a pair of substrates 102. Applying a voltage between the substrates 102 partially changes the refractive index of the liquid crystal layer 104. As such, a liquid crystal lens that serves as the separating unit is implemented.

Tenth Embodiment

Figure 17:
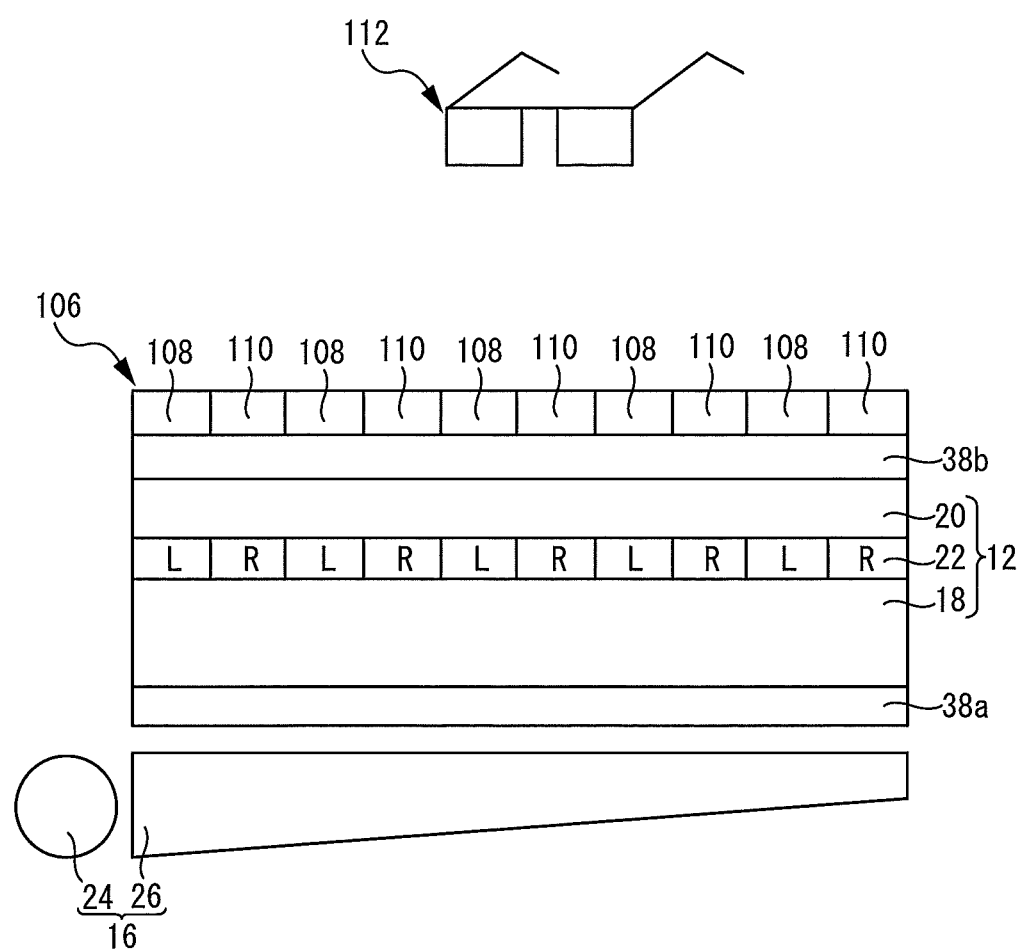
FIG. 17 is a schematic view of an exemplary configuration of a display device of a tenth embodiment of the present invention.

In the present embodiment, a partial phase plate 106 is provided instead of the barrier unit 14, as shown in FIG. 17. That is, the present embodiment is related to a stereoscopic display device assisted by polarizer glasses.

The partial phase plate 106 includes phase difference portions 108 and non-phase difference portions 110 arranged in an alternating manner. The phase difference portions 108 are ½ wavelength plates which are capable of rotating the polarizing direction of an incident light (linear polarized light) by 90 degrees.

In the present embodiment, the viewer can see the pixels L displaying left eye images through the phase difference portions 108, and the viewer can see the pixels R displaying right eye images through the non-phase difference portions 110. The viewer may use polarizer glasses 112 to see left eye images only with his left eye and see right eye images only with his right eye.

Eleventh Embodiment

Figure 18:
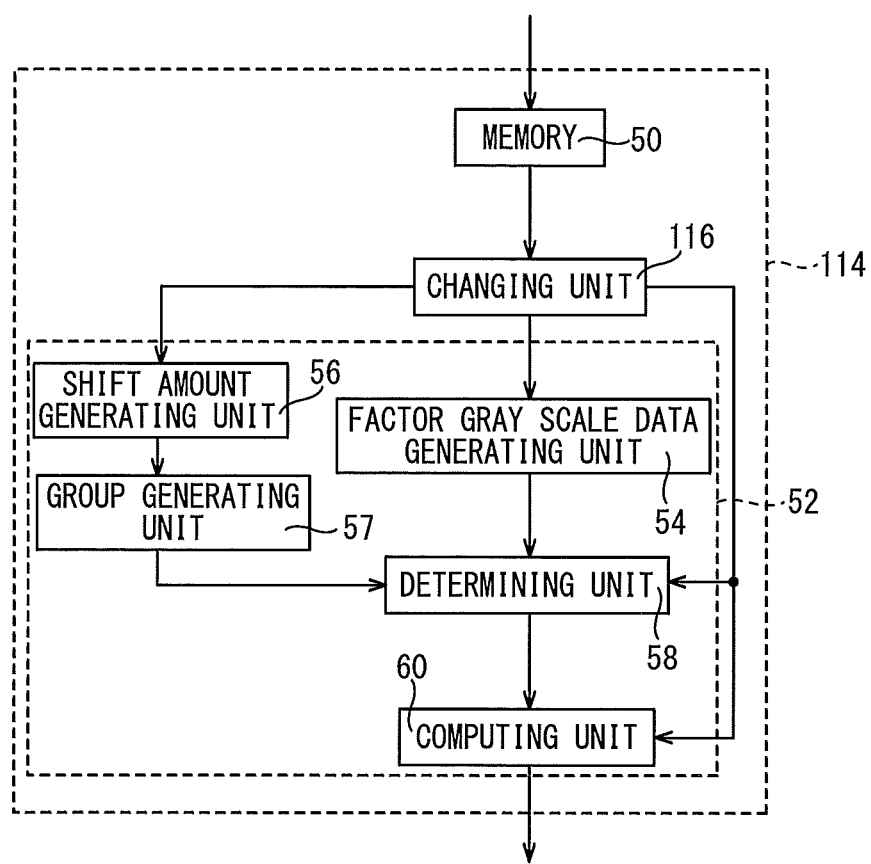
FIG. 18 is a schematic block diagram of an exemplary configuration of a display control unit included in a display device of an eleventh embodiment of the present invention.

In the present embodiment, a correcting unit 114 includes a changing unit 116, as shown in FIG. 18. The changing unit 116 may be located between the memory 50 and the factor gray scale data generating unit 54, for example. If the gray scale data is not a gray scale value but a voltage value or a luminance value, for example, the changing unit 116 allows the voltage or luminance values to be represented as data of a predetermined number of bits (for example, 10 bits or 16 bits) to represent 256 gray scale levels (8 bits). The correcting unit 114 uses the data resulting from changing by the changing unit 116 to correct the gray scale data.

The present application example facilitates correction of gray scale data even if the gray scale data is not a gray scale value.

Twelfth Embodiment

Figure 19:
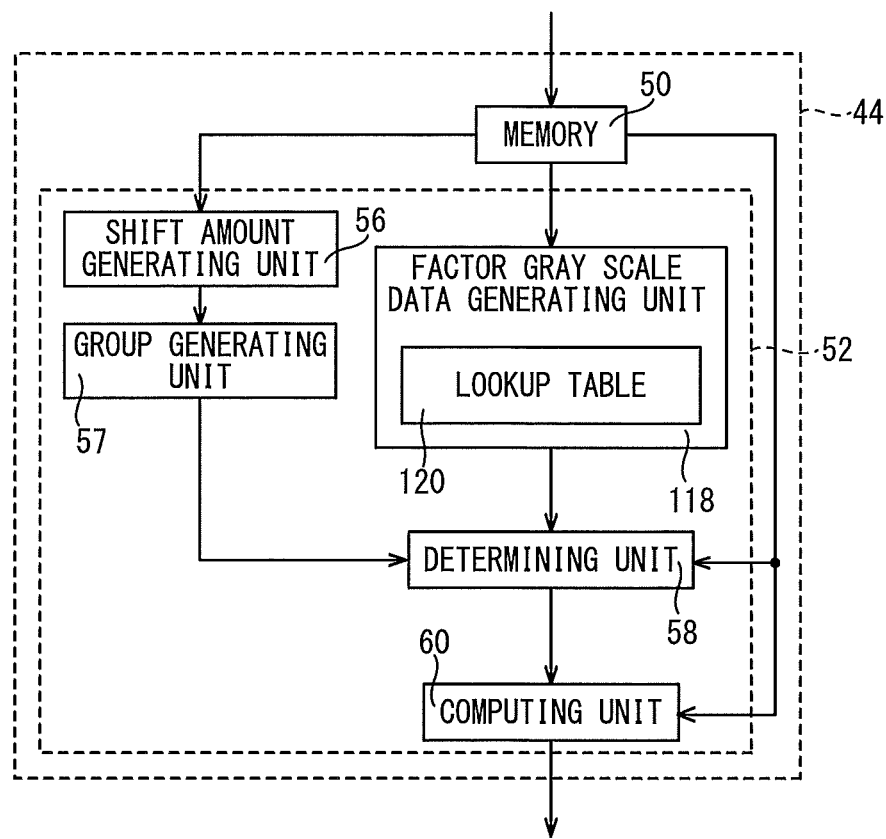
FIG. 19 is a schematic block diagram of an exemplary configuration of a display control unit included in a display device of a twelfth embodiment of the present invention.

In the present embodiment, the factor gray scale data generating unit 118 includes a lookup table 120, as shown in FIG. 19. The lookup table 120 indicates the relationship between the gray scale data of a pixel that displays an image other than an image that the viewer is supposed to view and the factor gray scale data. The lookup table 120 stores, for example, difference values in the gray scale data of pixels that display images other than an image that the viewer is supposed to view and that are located next to pixels that display the image that the viewer is supposed to view, and factor gray scale data corresponding to the difference values.

While embodiments of the present invention have been described in detail, they are merely exemplary and the present invention is not limited to the above embodiments.

For example, in the first embodiment, the barrier unit 14 may be replaced by a switch liquid crystal panel. In the switch liquid crystal panel, a liquid crystal layer is enclosed between a pair of substrates. Applying a voltage between the substrate forms a parallax barrier (separating unit) having portions that pass light (translucent slits) and portions that block light (light-shielding layers). The use of a switch liquid crystal panel allows the viewer to see a planar image when no parallax barrier is formed in the switch liquid crystal panel. Further, the use of a switch liquid crystal panel may realize 3D display or multi-view display even when the display device is turned, for example, from a vertical (horizontal) direction to a horizontal (vertical) direction, in other words regardless of whether the display device is positioned in a vertical or horizontal direction.

In the first embodiment, the display panel may be a plasma display panel, an organic electroluminescence (EL) panel, an inorganic EL panel, or the like. This applies to the other embodiments, too.

In the first embodiment, pixels located diagonally next to a pixel that displays an image that the viewer is supposed to view may also be factors for crosstalk. This applies to the other embodiments, too.

Of course, the present invention may also be employed in a display device that displays different images in a plurality of directions using a common display screen.

The invention claimed is:

1. A display device, comprising:
a display unit configured to display a combined image formed by dividing a plurality of different images into divided images and arranging the divided images in a predetermined order;
a separating unit configured to separate the plurality of images included in the combined image; and
a correcting unit configured to correct gray scale data of a pixel that displays one of the plurality of images included in the combined image that a viewer is supposed to view,
wherein the correcting unit includes:
a shift amount generating unit configured to generate a shift amount used to adjust gray scale data of each pixel that displays one of the plurality of images included in the combined image;
a determining unit configured to determine a correction amount used to correct the gray scale data using the shift amount generated by the shift amount generating unit; and
a group generating unit configured to group shift amounts generated by the shift amount generating unit according to a magnitude of each shift amount, and
wherein the determining unit determines the correction amount by referencing a number of shift amounts in each group generated by the group generating unit.

2. The display device according to claim 1, wherein the correcting unit further includes:
a reference data supply unit configured to supply reference data used when the determining unit determines the correction amount, and
the determining unit determines the correction amount by referencing the number of shift amounts in each group generated by the group generating unit and the reference data supplied by the reference data supply unit.

3. The display device according to claim 1, wherein the correction unit further includes a checking unit configured to check a region of the display unit where the combined image is displayed, and
the shift amount generating unit generates the shift amount using a result of checking by the checking unit.

4. The display device according to claim 1, wherein the correcting unit further includes a judging unit configured to judge whether each of the plurality of images is a still image or a dynamic image, and
the determining unit determines the correction amount using a result of judgment by the judging unit.

5. A display device comprising:
a display unit configured to display a combined image formed by dividing a plurality of different images into divided images and arranging the divided images in a predetermined order;
a separating unit configured to separate the plurality of images included in the combined image to allow them to be viewed from different directions; and
a correcting unit configured to correct gray scale data of a pixel that displays one of the plurality of images included in the combined image that a viewer is supposed to view,
wherein the correcting unit corrects the gray scale data of the pixel that displays the image that the viewer is supposed to view according to the following equation (1):

$$I_o = I_X + \{U \times (I_M - I_X) - (C+1) \times (I_Y+1)\}/(I_M+1) \quad (1),$$

where $I_X$ is the gray scale data of the pixel that displays the image that the viewer is supposed to view,
$T_Y$ is gray scale data of a pixel that is a factor for crosstalk,
$I_M$ is a maximum value of the gray scale data of the pixel that displays the image that the viewer is supposed to view,
C is a crosstalk level,
U is a shift amount used to adjust gray scale data of an image that displays each of the plurality of images included in the combined image, and
$I_o$ is gray scale data of the pixel for which correction has been done by the correcting unit,
wherein each of the shift amount U and the crosstalk level C is set to a predetermined value regardless of a kind of the plurality of images included in the combined image.

6. A display device, comprising:
a display unit configured to display a combined image formed by dividing a plurality of different images into divided images and arranging the divided images in a predetermined order;
a separating unit configured to separate the plurality of images included in the combined image; and
a correcting unit configured to correct gray scale data of a pixel that displays one of the plurality of images included in the combined image that a viewer is supposed to view,
wherein the correcting unit includes:
a shift amount generating unit configured to generate a shift amount used to adjust gray scale data of each pixel that displays one of the plurality of images included in the combined image;
a determining unit configured to determine a correction amount used to correct the gray scale data using the shift amount generated by the shift amount generating unit; and
a factor gray scale data generating unit configured to generate factor gray scale data that represents a factor for the crosstalk based on gray scale data of a pixel that displays one of the plurality of images included in the combined image that is other than the image that the viewer is supposed to view, and
wherein the determining unit determines the correction amount using the shift amount generated by the shift amount generating unit and the factor gray scale data generated by the factor gray scale data generating unit.

7. The display device according to claim 6, wherein the factor gray scale data generating unit generates the factor gray scale data by averaging gray scale data of pixels that display the one of the plurality of images included in the combined image that is other than the image that the viewer is supposed to view.

8. The display device according to claim 6, wherein the factor gray scale data generating unit generates the factor gray scale data by multiplying the gray scale data of the pixel that displays the one of the plurality of images included in the combined image that is other than the image that the viewer is supposed to view by a rate of contribution of that pixel to the crosstalk and sums a product.

9. The display device according to claim 6, wherein
the generating unit has a lookup table indicating a relationship between the gray scale data of the pixel that displays the image other than the image that the viewer is supposed to view and the factor gray scale data, and
the generating unit generates the factor gray scale data using the gray scale data of the pixel that displays the image other than the image that the viewer is supposed to view and the lookup table.

10. The display device according to claim 6, wherein the factor gray scale data generating unit generates the factor gray scale data by, when generating factor gray scale data for a pixel that displays the image that the viewer is supposed to view and that is located at an edge of a display region where the combined image is displayed, supposing gray scale data of a pixel that displays the image other than the image that the viewer is supposed to view and that does not exist, and using the supposed gray scale data to generate the factor gray scale data.

11. The display device according to claim 6, wherein the separating unit is a parallax barrier configured to separate the plurality of images included in the combined image to allow them to be viewed from different directions.

12. The display device according to claim 6, wherein the separating unit is a lenticular lens configured to separate the plurality of images included in the combined image to allow them to be viewed from different directions.

13. The display device according to claim 6, wherein the separating unit is a liquid crystal lens configured to separate the plurality of images included in the combined image to allow them to be viewed from different directions.

14. The display device according to claim 6, further comprising:
    a converting unit configured to convert the gray scale data to data of a predetermined number of bits,
    wherein the correcting unit corrects the gray scale data using the data resulting from conversion by the converting unit.

\* \* \* \* \*